United States Patent
Dayal et al.

(10) Patent No.: US 8,392,317 B2
(45) Date of Patent: Mar. 5, 2013

(54) FACILITATING ELECTRONIC AUCTION OF PREPAYMENT OF AN INVOICE

(75) Inventors: Kshitij Dayal, San Jose, CA (US); Yuan Tung, Fremont, CA (US); Satyajit Choudhury, Bangalore (IN); Raja Polisetti, Bangalore (IN); Tanvi Bakul Shah, San Jose, CA (US); Ramakrishna Vadla, Bangalore (IN); Jegnaw Ayele, San Jose, CA (US); Andrew Hofler, Cranberry Township, PA (US)

(73) Assignee: Ariba, Inc., Sunnyvale, CA (US)

( * ) Notice: Subject to any disclaimer, the term of this patent is extended or adjusted under 35 U.S.C. 154(b) by 155 days.

(21) Appl. No.: 12/942,119

(22) Filed: Nov. 9, 2010

(65) Prior Publication Data
US 2012/0116908 A1  May 10, 2012

(51) Int. Cl.
*G06Q 40/00* (2012.01)

(52) U.S. Cl. .......................................................... 705/37
(58) Field of Classification Search ...................... 705/37
See application file for complete search history.

(56) References Cited

U.S. PATENT DOCUMENTS

| | | |
|---|---|---|
| 6,285,989 B1 | 9/2001 | Shoham |
| 6,584,451 B1 | 6/2003 | Shoham et al. |
| 6,606,603 B1 | 8/2003 | Joseph et al. |
| 6,952,682 B1 | 10/2005 | Wellman |
| 7,072,061 B2 | 7/2006 | Blair et al. |
| 7,117,165 B1 | 10/2006 | Adams et al. |
| 7,130,815 B1 | 10/2006 | Gupta |
| 7,146,331 B1 | 12/2006 | Young |
| 7,152,043 B2 | 12/2006 | Alaia et al. |
| 7,225,145 B2 | 5/2007 | Whitley et al. |
| 7,225,152 B2 | 5/2007 | Atkinson et al. |
| 7,249,085 B1 | 7/2007 | Kinney, Jr. et al. |
| 7,283,979 B2 | 10/2007 | Tulloch et al. |
| 7,283,980 B2 | 10/2007 | Alaia et al. |
| 7,296,001 B1 | 11/2007 | Ephrati et al. |
| 7,346,574 B2 | 3/2008 | Smith et al. |
| 7,383,206 B2 | 6/2008 | Rupp et al. |
| 7,395,238 B2 | 7/2008 | Alaia et al. |
| 7,401,035 B1 | 7/2008 | Young |
| 7,444,299 B2 | 10/2008 | Smith et al. |
| 7,483,852 B2 | 1/2009 | Marhafer et al. |
| 7,499,876 B2 | 3/2009 | Rupp et al. |
| 7,536,362 B2 | 5/2009 | Starr et al. |
| 7,558,746 B2 | 7/2009 | Alaia et al. |
| 7,558,752 B1 | 7/2009 | Ephrati et al. |
| 7,571,137 B2 | 8/2009 | Alaia et al. |
| 7,599,878 B2 | 10/2009 | Atkinson et al. |
| 7,634,439 B1 | 12/2009 | Smith |
| 7,657,461 B2 | 2/2010 | Young |
| 7,693,747 B2 | 4/2010 | Bryson et al. |
| 7,792,707 B2 | 9/2010 | Alaia et al. |
| 7,792,713 B1 | 9/2010 | Kinney, Jr. et al. |
| 7,813,966 B2 | 10/2010 | Alaia et al. |
| 7,835,957 B1 | 11/2010 | Kinney, Jr. |
| 7,840,476 B1 | 11/2010 | Zack et al. |

(Continued)

*Primary Examiner* — Olabode Akintola
(74) *Attorney, Agent, or Firm* — Brian R. Short

(57) ABSTRACT

Embodiments for facilitating an electronic auction of prepayment of an invoice are disclosed. One method includes a supplier and a buyer approving the invoice with definite terms. The supplier electronically submits the invoice with proposed prepayment terms to an exchange platform. The exchange platform provides an electronic auction of the invoice with proposed prepayment terms to a plurality of bidders and receiving a bid from at least one of the plurality of bidders. Payment of the invoice between the winning bidder and the supplier is electronically facilitated if a winning bid is received.

13 Claims, 5 Drawing Sheets

U.S. PATENT DOCUMENTS

| | | |
|---|---|---|
| 7,870,034 B2 | 1/2011 | Rupp et al. |
| 7,870,054 B2 | 1/2011 | Abeshouse et al. |
| 7,870,115 B2 | 1/2011 | Blair et al. |
| 7,921,053 B2 | 4/2011 | Kinney, Jr. et al. |
| 7,974,908 B1 | 7/2011 | Hommrich et al. |
| 8,086,518 B1 | 12/2011 | Maor |
| 8,095,451 B2 | 1/2012 | Smith et al. |
| 8,126,701 B2 | 2/2012 | Beck |
| 8,126,799 B2 | 2/2012 | Kellam et al. |
| 8,190,482 B1 | 5/2012 | Federighi et al. |
| 2006/0253394 A1 | 11/2006 | Mao |
| 2007/0214060 A1 | 9/2007 | Whitley et al. |
| 2007/0239596 A1 | 10/2007 | Kinney, Jr. et al. |
| 2007/0299765 A1 | 12/2007 | Smith et al. |
| 2008/0027879 A1 | 1/2008 | Ephrati et al. |
| 2008/0065526 A1 | 3/2008 | Smith et al. |
| 2008/0071634 A1 | 3/2008 | Rampell et al. |
| 2008/0071672 A1 | 3/2008 | Rupp et al. |
| 2008/0091528 A1 | 4/2008 | Rampell et al. |
| 2008/0133377 A1 | 6/2008 | Alaia et al. |
| 2008/0133397 A1 | 6/2008 | Tulloch et al. |
| 2008/0133398 A1 | 6/2008 | Kinney et al. |
| 2008/0133399 A1 | 6/2008 | Rupp et al. |
| 2008/0147533 A1 | 6/2008 | Alaia et al. |
| 2008/0147534 A1 | 6/2008 | Ephrati et al. |
| 2008/0154763 A1 | 6/2008 | Alaia et al. |
| 2008/0162285 A1 | 7/2008 | Tulloch et al. |
| 2008/0162330 A1 | 7/2008 | Atkinson et al. |
| 2008/0162331 A1 | 7/2008 | Ephrati et al. |
| 2008/0162332 A1 | 7/2008 | Alaia et al. |
| 2008/0183614 A1 | 7/2008 | Gujral et al. |
| 2008/0208616 A1 | 8/2008 | Young |
| 2009/0099933 A1 | 4/2009 | Marhafer et al. |
| 2010/0017273 A1 | 1/2010 | Hommrich et al. |
| 2010/0017324 A1* | 1/2010 | Brownhill et al. ............ 705/37 |
| 2010/0191643 A1 | 7/2010 | Brady et al. |
| 2011/0087554 A1* | 4/2011 | Roberts ...................... 705/26.3 |
| 2011/0166951 A1 | 7/2011 | Abeshouse et al. |

* cited by examiner

FACILITATING ELECTRONIC AUCTION OF PREPAYMENT OF AN INVOICE

FIELD OF THE DESCRIBED EMBODIMENTS

The described embodiments relate generally to prepayment of invoices. More particularly, the described embodiments relate to a method, apparatus and system for facilitating an electronic auction of prepayment of an invoice.

BACKGROUND

Purchase agreements (contracts or invoice) are routinely made between suppliers and buyers. Typically, a buyer identifies goods for purchase. The buyer submits a purchase order to the supplier for the identified good, and the supplier submits an invoice to the buyer. Typically, the contract between the supplier and buyer (purchase order) includes a purchase price, and a payment terms.

In some situations, the supplier has a need for cash after an invoice has been approved, but before the invoice has been paid. To address the cash need, the supplier may be willing to reduce the price of the invoice in exchange for prepayment of the invoice. The supplier or the buyer may then suggest reducing the amount due a certain amount in exchange for reducing the payment term. That is, the supplier may offer a reduction in amount due through prepayment, in which the prepayment is made within a reduced payment term.

The supplier, however, is limited to negotiating the prepayment of the invoice with the buyer. Other parties are not involved. Therefore, if the buyer cannot or will not prepay the invoice, the supplier does not have an alternate source for prepayment.

There is a need for a method, apparatus and a system for providing a supplier with alternative ways to obtain prepayment of an invoice.

SUMMARY

An embodiment includes a method of facilitating an electronic auction of prepayment of an invoice. The method includes a supplier and a buyer approving the invoice with definite terms. The supplier electronically submits the invoice with proposed prepayment terms to an exchange platform. The exchange platform provides an electronic auction of the invoice with proposed prepayment terms to a plurality of bidders and receiving a bid from at least one of the plurality of bidders. Payment of the invoice between the winning bidder and the supplier is electronically facilitated if a winning bid is received.

Another embodiment includes a system for facilitating an electronic auction of prepayment of an invoice. The system includes a contract server electronically facilitating approval of the invoice between a supplier and a buyer with definite terms. The contract server electronically provides the invoice with proposed prepayment terms to an exchange platform server. The exchange platform manages an electronic auction of the invoice with proposed prepayment terms with a plurality of bidders. Electronic payment of the invoice between the winning bidder and the supplier is facilitated if a winning bid is received.

Another embodiment includes a server for facilitating an electronic auction of prepayment of an invoice. The server includes a business-to-business (B2B) network for facilitating approval of an invoice between a supplier and a buyer with definite terms. The B2B network interfaces with an exchange platform server, and electronically provides the invoice to the exchange platform server with proposed prepayment terms. The exchange platform server facilitates an electronic auction of the purchase agreement with proposed prepayment terms to a plurality of bidders and receives a bid from at least one of the plurality of bidders. If a winning bid is received, payment of the purchase agreement between the winning bidder and the supplier is electronically facilitated.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods and apparatuses for providing alternate avenues to suppliers for prepayment of invoices. At least some of the described embodiments provide suppliers with the availability and capability of auctioning of the invoice, thereby allowing the supplier to obtain prepayment of the invoices. The auctions provide that supplier to capital from sources other than the buyer. Additionally, some of the described embodiments provide the suppliers with a cash optimizer that can inform the supplier of invoice available to meet a defined cash need. Additional embodiments can include the cash optimizer informing the supplier of the potential success of an auction of an invoice.

While the described embodiments include an invoice containing the contractual terms between a supplier and a buyer, it is to be understood that the invoice is a purchase agreement which may be referred to in a different way.

Figure 1:
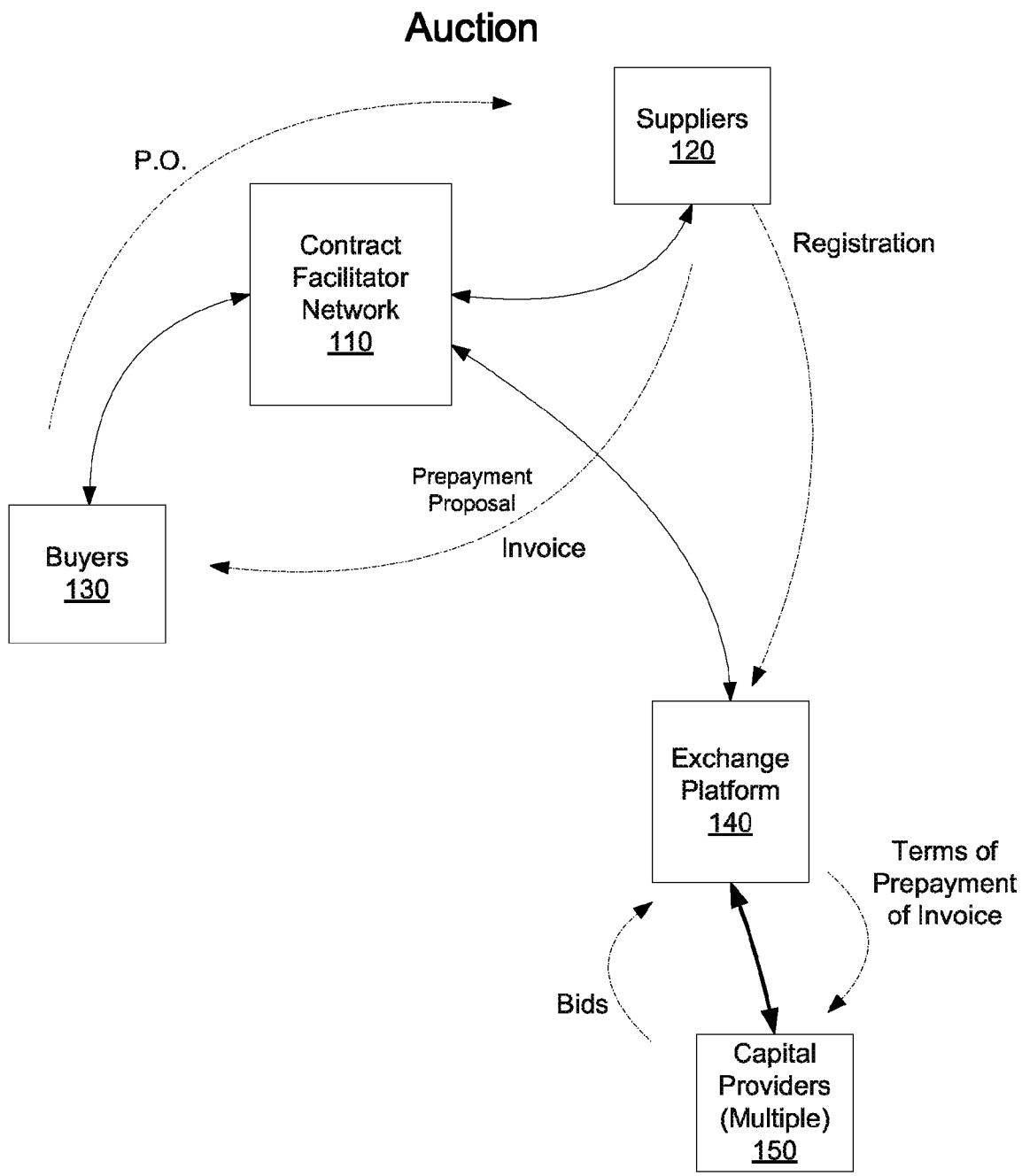
FIG. 1 shows an example of a system that facilitates electronic auction of prepayment of an invoice.

FIG. 1 shows an example of a system that facilitates an electronic auction of prepayment of an invoice. A contract facilitator network 110 can provide an interface between a supplier 120 and a buyer 130. For example, the buyer 130 can submit a purchase order (PO) which is received by the supplier 120. In response, an invoice can be submitted by the supplier 120 to the buyer 130. Typically, the invoice includes definite terms that include, for example, a payment amount, and a time duration in which the payment is due to be paid by the buyer 130 to the supplier 120. The definite terms of the invoice can be agreed upon between the supplier 120 and the buyer 130 through the contract facilitator network 110, or the definite terms of the invoice can be agreed upon between the supplier 120 and the buyer 130 independent of the contract facilitator network 110.

After the definite terms of the invoice are in place, either the buyer can offer to prepay the invoice (that is, submit payment before the time required per the invoice), or the seller may request prepayment. In exchange for prepayment, the supplier 120 can offer a reduction in the payment amount required to complete the invoice. However, the buyer may be unable or unwilling to prepay.

An exchange platform 140 provides the supplier 120 with an alternate method of receiving prepayment. The supplier 120 can submit the invoice between the supplier 120 and the buyer 130 to the exchange platform 140. An embodiment includes the supplier additionally providing proposed prepayment terms, however, other embodiment include the supplier confirming, but not directly submitting proposed prepayment terms. The exchange platform 140 makes the terms of the invoice available to multiple capital providers 150. The capital providers 150 can then bid to purchase the invoice. The purchase appears to the supplier 120 to be a prepayment of the invoice. To the buyer 130, the terms of the invoice remain the same. However, the payment from the buyer to the capital provider can be electronically managed without the buyer even being aware. The capital providers 150 are essentially investors that provide capital (for example, dollars) that is transferred to the suppliers with the assumption that the amount they (the capital provider) will receive per the contract from the buyer will be greater than the amount they paid.

The exchange platform 140 makes the terms of the contract and prepayment terms available to the capital providers 150. The capital providers 150 can the auction on prepayment of the contract. That is, the exchange platform 140 receives bids from the capital providers 150.

For an embodiment, the supplier 120 must register with the exchange platform. Demographic information and other details of the supplier can be provided to the exchange platform.

Once an auction is initiated by the supplier 120 through the exchange platform 140, the supplier 120 can approve or disapprove of a winning bid. A' winning bid is typically the bid offering the greatest payment under a proposed prepayment term. However, there can be other factors that determine a winning bid.

Figure 2:
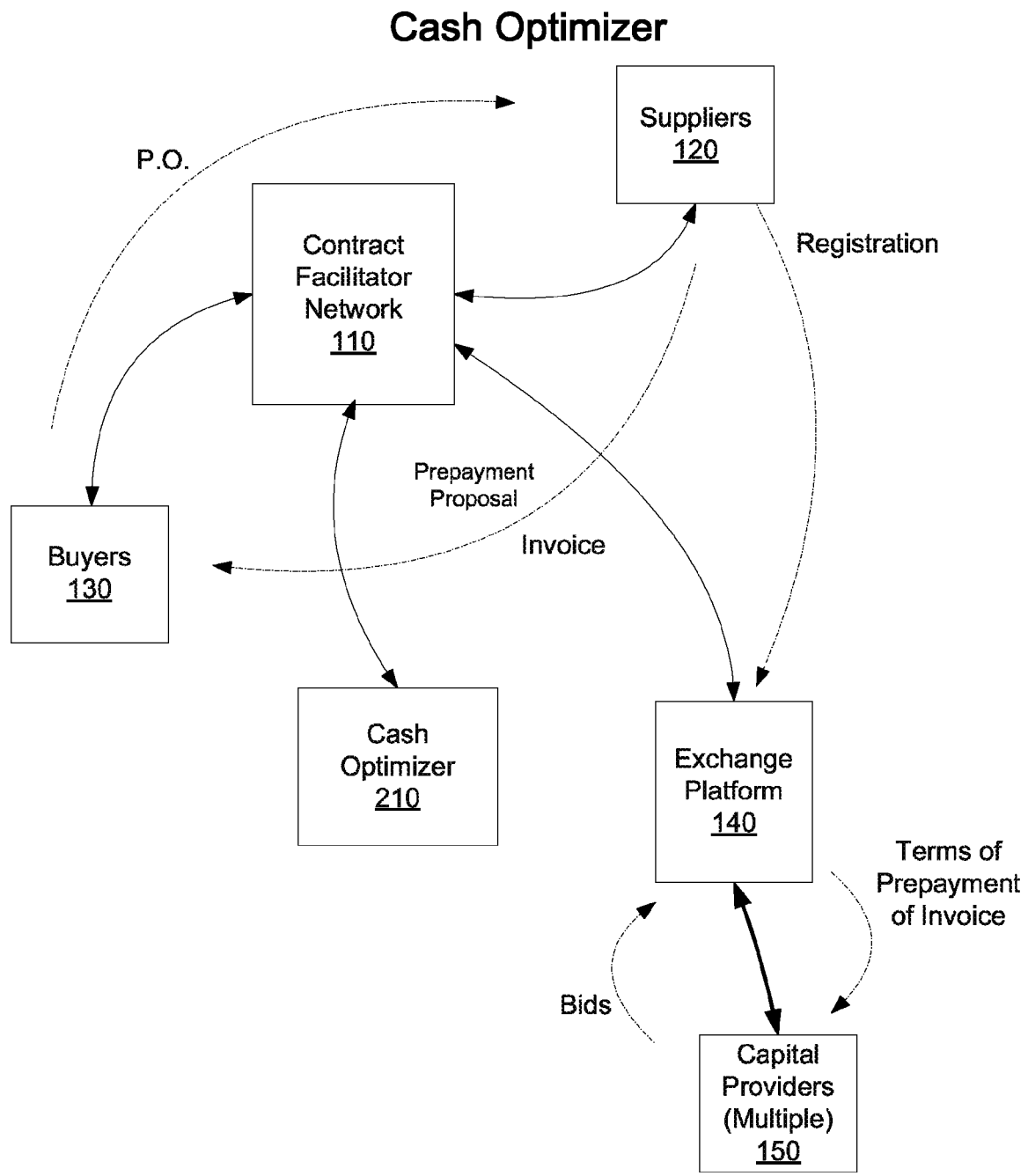
FIG. 2 shows an example of a system that facilitates an electronic auction of prepayment of an invoice, and further includes a cash optimizer.

FIG. 2 shows an example of a system that facilitates an electronic auction of prepayment of a contract, and further includes a cash optimizer 210. Situations can arise in which a supplier 120 is offered a prepayment with certain terms from a buyer. The supplier, however, is faced with a decision of whether to take the offer of the buyer 130 or attempt to put the contract up for auction through the exchange platform 140. One embodiment of the cash optimizer 210 informs the supplier 120 of invoices available to meet a defined cash need. Other embodiments of the cash optimizer 210 include aiding the supplier 120 with information to allow the supplier 120 to decide whether an auction is optionally better for the supplier 120 than dealing directly with the buyer 130. Other embodiments of the cash optimizer 210 provide predictions of how successful the auction of the invoice on the exchange platform 140 will be.

For an embodiment, the cash optimizer 210 or the contract facilitator maintains a data base or prior prepayment contract auctions of the exchange platform 140. Based on prior auctions, the probable results of a future auction can be predicted. That is, prior auctions involving similar contact with similar prepayment terms can be accessed and analyzed to provide an estimate of the probable outcome of an auction of a present contract and prepayment terms.

Other embodiments of the cash optimizer 210 can provide ways for step wise refinement of invoices. Additionally, the cash optimizer 210 can be enhanced to include buyer specific auction rates from historical data.

Figure 3:
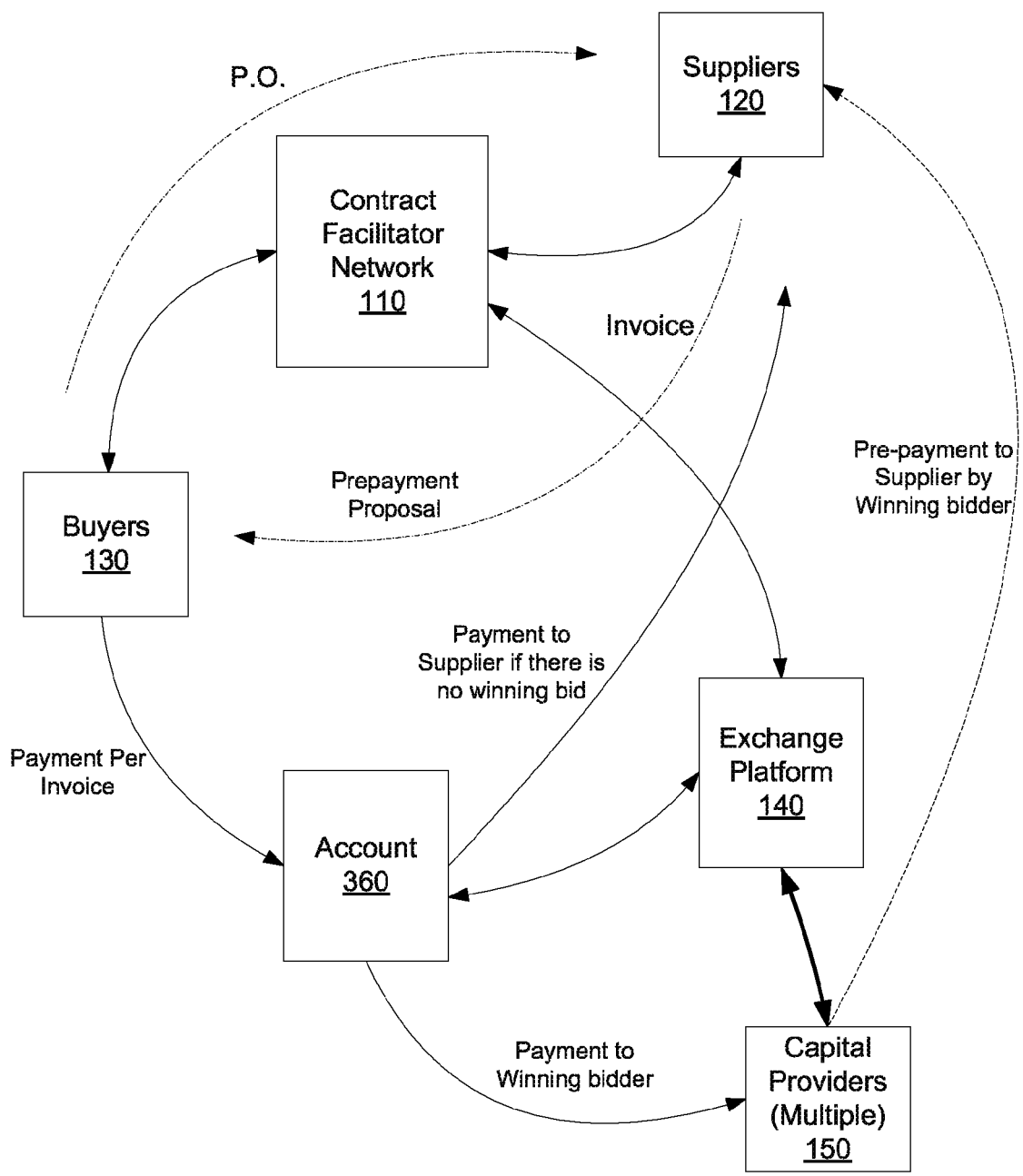
FIG. 3 shows an example of a system that facilitates an electronic auction of prepayment of an invoice, and further facilitates payments between suppliers, buyers and capital providers.

FIG. 3 shows an example of a system that facilitates an electronic auction of prepayment of a contract (invoice), and further facilitates payments between suppliers, buyers and capital providers. More specifically, FIG. 3 includes an account 360 that facilitates payments between the parties. After the contract has been agreed upon, an embodiment includes the buyer making payment to the account 360 per the terms of the contract whether an auction occurs or not. That is, the exchange platform 140 and the capital providers 150 do not influence the obligations and activities of the buyer 130. However, if a successful auction of the contract with prepayment terms does occur, the supplier 120 is prepaid by the account 360 after the winning bidder (capital provider 150) has made the prepayment per the terms of the auction to the account 360. If a successful auction of the contract does not occur, the supplier 120 receives payment from the account after the buyer makes payment to the account 360 per the terms of the original contract.

Figure 4:
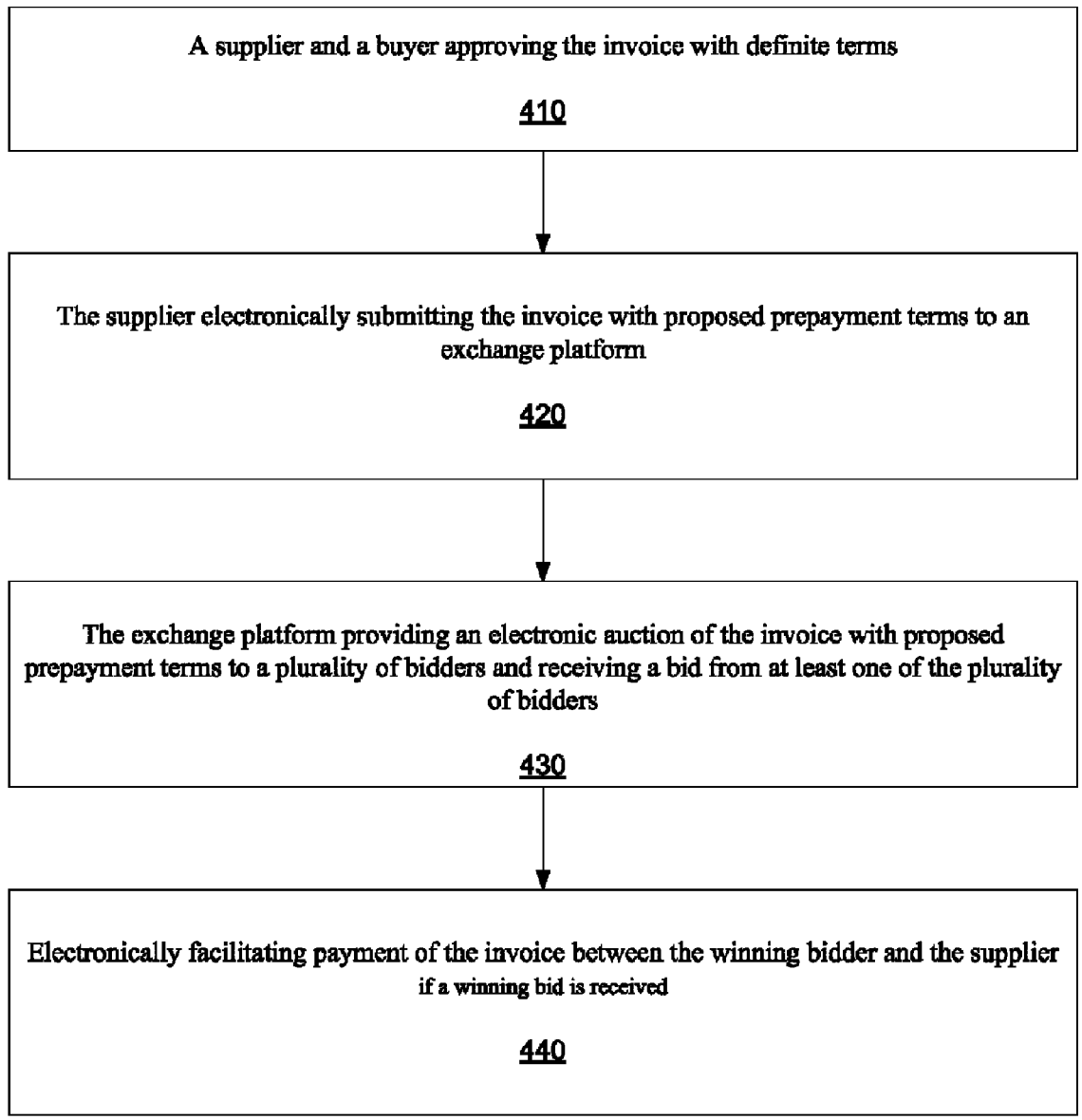
FIG. 4 is a flow chart that includes steps of an example of a method of facilitating an electronic auction of prepayment of an invoice.

FIG. 4 is a flow chart that includes steps of an example of a method of facilitating an electronic auction of prepayment of an invoice. A first step 410 includes a supplier and a buyer approving the invoice with definite terms. A second step 420 includes the supplier electronically submitting the invoice with proposed prepayment terms to an exchange platform. A third step 430 includes the exchange platform providing an electronic auction of the invoice with proposed prepayment terms to a plurality of bidders and receiving a bid from at least one of the plurality of bidders. A fourth step 440 includes electronically facilitating payment of the invoice between the winning bidder and the supplier if a winning bid is received.

For an embodiment, the winning bid is a one of a plurality of bids received from the plurality of bidders having a highest value. For embodiments, a single invoice, or even a batch of invoices can be auctioned and subsequently purchased (bought) by multiple bidders. That is, for example, multiple bidders A, B, C could each bid for 33.33% of the auction. Upon settling of the invoice, each of the winning bidders A, B, C each get 33.33% of the proceeds. That is, for an embodiment, the winning bid comprises a combination of a plurality of bidders.

Once a winning bid has been identified an approved by the supplier, the winning bidder makes payment to the supplier according to the proposed prepayment terms. At a later date the winning bidder receives payment according the definite terms of the invoice. The winning bidder can be a capital provider who receives payment from the buyer that is greater than the payment made by the winning bidder.

Embodiments of the exchange platform include the bidders being registered capital providers. Additionally or alternatively, the buyers are qualified.

For an embodiment, before being electronically submitted to the exchange platform, at least one of the supplier and the buyer proposes prepayment terms of the invoice. The proposed payment terms can provide the basis for prepayment terms submitted to the exchange platform.

For an embodiment, the buyer makes payment to a receivable account independent of whether a winning bid is received. If a winning bid is received by the exchange platform, payment is made from the receivable account to the winning bidder. Further, if a winning bid is not received, payment being made from the receivable account to the supplier per the original agreement.

An embodiment further includes a cash optimizer. The cash optimizer provides the supplier with a projection how successful an auction of the invoice would be, aiding the supplier in determining whether to submit the invoice to the exchange platform. For an embodiment, the cash optimizer provides the projection based on historical information of previous auctions.

Figure 5:
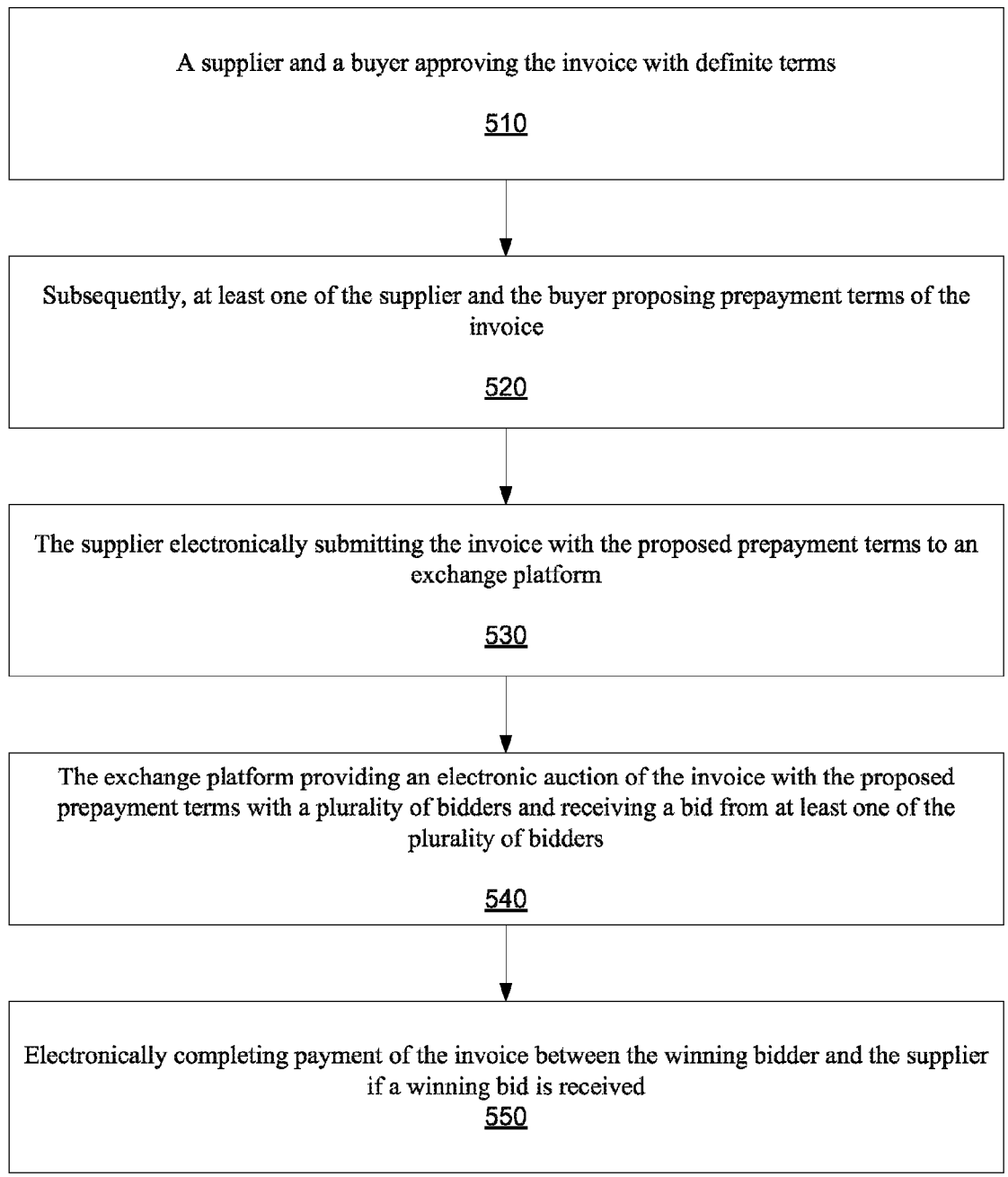
FIG. 5 is a flow chart that includes steps of another example of a method of electronically modifying terms of an agreement.

FIG. 5 is a flow chart that includes steps of another example of a method of facilitating an electronic auction of prepayment of an invoice. A first step 510 includes a supplier and a buyer approving the invoice with definite terms. A second step 520 includes subsequently, at least one of the supplier and the buyer proposing prepayment terms of the invoice. A third step 530 includes the supplier electronically submitting the invoice with the proposed prepayment terms to an exchange platform. A fourth step 540 includes the exchange platform providing an electronic auction of the invoice with the proposed prepayment terms with a plurality of bidders and receiving a bid from at least one of the plurality of bidders. A fifth step 550 includes electronically completing payment of the invoice between the winning bidder and the supplier if a winning bid is received.

Although specific embodiments have been described and illustrated, the embodiments are not to be limited to the specific forms or arrangements of parts so described and illustrated.

What is claimed:

1. A method of facilitating an electronic auction of prepayment of an invoice, comprising;
   facilitating, through a contract facilitator, approval of the invoice with definite terms between a supplier and a buyer;
   informing, by a cash optimizer, the supplier whether the invoice is available for meeting a defined cash need of the supplier;
   receiving, by the supplier, a prepayment offer from the buyer;
   providing the prepayment offer to a cash optimizer, wherein the cash optimizer provides the supplier with information to aid the supplier in determining whether to take the prepayment offer from the buyer, or submit the invoice with proposed prepayment terms to an exchange platform;
   if the supplier decides to submit the invoice, then the supplier electronically submitting the invoice with proposed prepayment terms to the exchange platform;
   the exchange platform providing an electronic auction of the invoice with proposed prepayment terms to a plurality of bidders and receiving a bid from at least one of the plurality of bidders;
   if a winning bid is received, electronically facilitating payment of the invoice between the winning bidder and the supplier.

2. The method of claim 1, wherein the winning bid is a one of a plurality of bids received from the plurality of bidders having a highest value.

3. The method of claim 2, wherein the winning bid comprises a combination of a plurality of bidders.

4. The method of claim 2, further comprising the winning bidder making payment to the supplier according to the proposed prepayment terms.

5. The method of claim 4, further comprising the winning bidder receiving payment according the definite terms of the invoice.

6. The method of claim 5, wherein the payment received by the winning bidder is greater than the payment made by the winning bidder.

7. The method of claim 1, wherein at least one of the supplier and the buyer proposes prepayment terms of the invoice, thereby setting the proposed prepayment terms electronically submitted to the exchange platform.

8. The method of claim 1, wherein the buyer makes payment to a receivable account independent of whether a winning bid is received.

9. The method of claim 8, further comprising payments being made from the receivable account to the winning bidder if a winning bid is received.

10. The method of claim 8, further comprising payment being made from the receivable account to the supplier if a winning bid is not received.

11. The method of claim 1, further comprising the bidders being registered capital providers.

12. The method of claim 1, further comprising the buyers being qualified.

13. A method of facilitating an electronic auction of prepayment of an invoice, comprising;
    facilitating, through a contract facilitator, approval of the invoice with definite terms between a supplier and a buyer;
    informing, by a cash optimizer, the supplier whether the invoice is available for meeting a defined cash need of the supplier;
    subsequently, at least one of the supplier and the buyer proposing prepayment terms of the invoice;
    providing the prepayment offer to a cash optimizer, wherein the cash optimizer provides the supplier with information to aid the supplier in determining whether to take the prepayment offer from the buyer, or submit the invoice with proposed prepayment terms to an exchange platform;
    if the supplier decides to submit the invoice, then the supplier electronically submitting the invoice with proposed prepayment terms to the exchange platform;
    the exchange platform providing an electronic auction of the invoice with the proposed prepayment terms with a plurality of bidders and receiving a bid from at least one of the plurality of bidders;
    if a winning bid is received, electronically completing payment of the invoice between the winning bidder and the supplier.

* * * * *